United States Patent [19]

Pritchard

[11] 4,127,347
[45] Nov. 28, 1978

[54] CORNER GUSSET

[76] Inventor: Roger D. Pritchard, 100 S. 17th St., Sebring, Ohio 44672

[21] Appl. No.: 823,511

[22] Filed: Aug. 10, 1977

[51] Int. Cl.² .................. E04B 1/38; F16B 7/00
[52] U.S. Cl. .................. 403/402; 403/231; 403/295; 52/657
[58] Field of Search .............. 403/402, 295, 231, 401; 52/657; 160/381

[56] References Cited

U.S. PATENT DOCUMENTS

| 1,343,445 | 6/1920 | Gaffers ........................... 52/657 |
| 3,818,672 | 6/1974 | Moore, Sr. ....................... 403/295 |

FOREIGN PATENT DOCUMENTS 1,000,117  11/1976  Canada .................................. 403/402

Primary Examiner—Andrew V. Kundrat
Attorney, Agent, or Firm—Alfred E. Wilson

[57] ABSTRACT

A one piece corner gusset for rigidly attaching the miter corners of hollow frame structures employed in the fabrication of various sheet metal members, such as some types of doors including screen doors. The gusset is comprised of a metal bar formed into a generally right triangular configuration, the two right angular legs thereof being connected by a hypotenuse portion which functions as a draw bar to properly align and maintain a rigid connection between two right angularly disposed hollow frame members when the gusset is positioned therein and fastened in place by any suitable fastening means such as screws.

3 Claims, 4 Drawing Figures

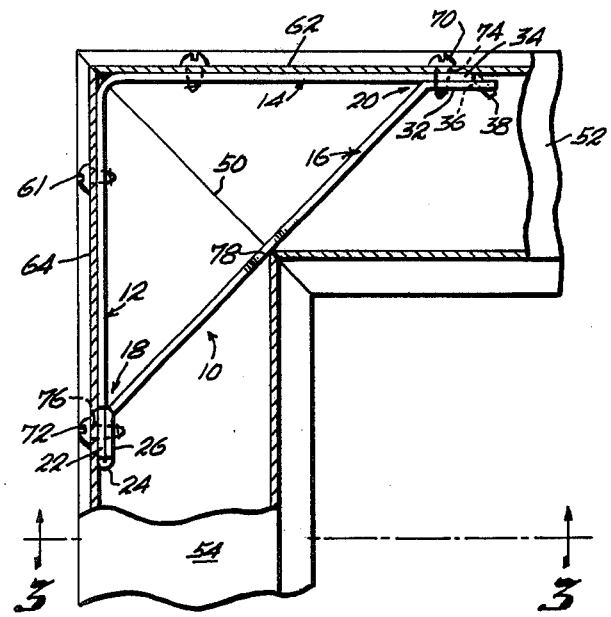
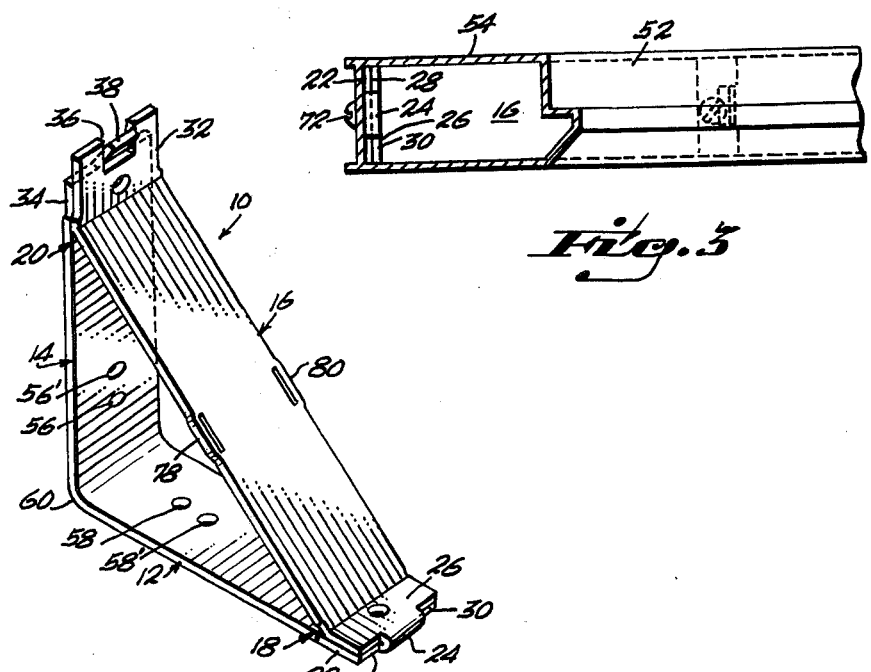
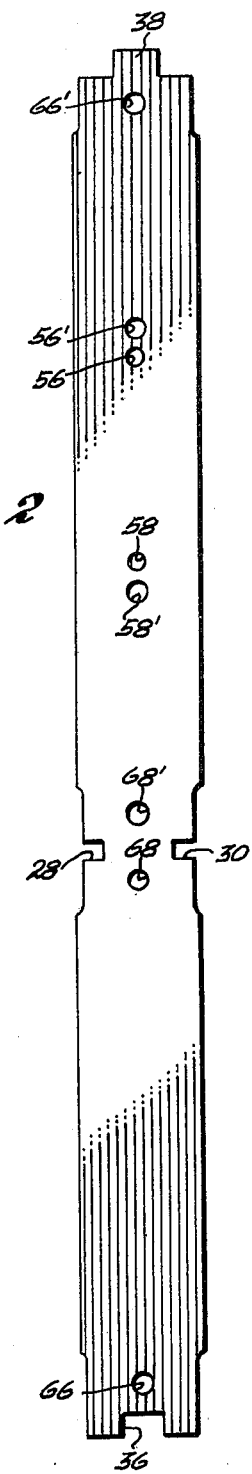

CORNER GUSSET

BACKGROUND OF THE PRESENT INVENTION

Hollow door frames formed of a metal material such as aluminum, screen doors for example, are comprised of parallel top and bottom rails and parallel vertical side rails. It is common practice to join the mitered corners of the various rails with angle gussets, however, various forces created by the stresses and strains imposed on the door from its own weight as well as by hard usage often bend or twist the angle gussets, resulting in the opening of one or more of the corner miter joints.

While the corner gusset of the present invention is particularly adapted for use in the construction of screen doors, it is equally adaptable for use in forming rigid miter corner connection in other types of doors as well as windows, and other articles formed of sheet metal members, etc.

OBJECTS

It is therefore a principal object of the present invention to provide a one piece triangular gusset for rigidly joining the miter corner joints of a hollow frame structure.

It is a further object of the invention to provide a one piece triangular gusset, formed from a single flat metal bar, and means to connect the two free ends of the bar after being so formed without the use of rivets, welding or the like.

Another object of the invention is to provide a notch, formed in one end of the metal bar, and an outwardly extending lug extending from the opposed end thereof in a position to be bent over into the notch to rigidly secure the gusset in its formed right triangular shape.

BRIEF DESCRIPTION OF THE DRAWINGS

FIG. 1 is an elevational view of one corner miter joint of a hollow frame structure with portions broken away to illustrate the corner gusset of the present invention;

FIG. 2 is a plan view of the metal bar from which the corner gusset is formed;

FIG. 3 is a cross sectional view taken along line 3—3 of FIG. 1; and

FIG. 4 is a perspective view of the formed corner gusset of the present invention.

DETAILED DESCRIPTION OF THE DRAWINGS

With reference to the drawings in which like reference characters designate like or corresponding parts throughout the various views and with particular reference to FIGS. 1 and 4, the corner gusset of the present invention is designated generally at 10. In its formed condition it comprises two right angular legs 12 and 14 spanned by a hypotenuse portion, comprising a draw bar 16, to define first and second acute angles, 18 and 20, relative to the respective legs 12 and 14. At the acute angle 18, the leg 12 is extended therebeyond as at 22 and is folded over at 24 to an overlapping span 26 extending to the angle 18. Cut-outs 28 and 30 are provided on the opposed sides of the fold 24.

At the angle 20, the draw bar 16 is angled outwardly to define an extension 32 in an overlying relation to a straight extension 34 from leg 14. A central notch 36 is formed in the end of extension 32 and a lug 38 struck from extension 34 is bent forwardly to extend through notch 36, whereby draw bar 16 and the leg portions 12 and 14 are locked against relative lateral movement.

FIGS. 1 and 3 illustrate a gusset 10 of the present invention fixed in a holding relation to a corner miter joint 50 within a hollow top rail 52 and a similar side rail 54. Rails 52, 54 may be tubular or of inwardly opening channel configurations. As best illustrated in FIGS. 1 and 4, the legs 12 and 14 of gusset 10 are provided with respective pairs of holes 56, 56' and 58, 58' adjacent the rounded nose 60 at the right angle bend defining legs 12, 14. Holes 56, 56' and 58, 58' accommodate fastening means such as self tapping screws 61, engaged therein through appropriately aligned holes in respective rail edges 62, 64 of rails 52, 54. The pairs of holes 56, 56' 58, 58' are of different sizes for selective use to accommodate self tapping screws when threaded inwardly as illustrated in FIG. 1, or outwardly through legs 12, 14 into threaded engagement in rail edges 62, 64.

A similar pair of holes 66, 66' and 68, 68' are formed respectively in extensions 32, 34 and fold extensions 22, 26. In the formed condition of gusset 10 of FIGS. 1 and 4, each pair of holes 66, 66' are aligned for reception of self tapping screws 70 and 72 extending through holes 74, 76 in the respective rail edges 62, 64. Both edges of draw bar 16 are expanded as at 78 and 80, midway of their lengths, to bear against the opposed sides of the miter joint 50 as seen in FIG. 1, and when screws 70, 72 are tightened in place, the draw bar 16, draws the miter joint 50 rigidly together.

While a preferred form of the invention has been illustrated and described, it will be obvious to those skilled in the art that various changes and modifications can be made therein without departing from the true spirit of the invention as defined in the appended claims.

I claim:

1. A corner gusset for fastening a miter joint defined by abutting angular ends of two angularly disposed hollow rails of a frame structure, each rail having generally parallel side walls and an outer edge web spanning the side walls, said corner gusset comprising a generally right triangular bracket formed from a straight bar length of a suitable material such as steel and aluminum, the bar being bent to define first and second right angularly disposed legs and a hypotenuse having first and second ends, comprising a draw bar, and forming first and second acute angles relative to said first and second legs, an extension from said first leg beyond said first acute angle, an extension from said draw bar first end angled relative thereto to overlie said first leg extension in an integrally formed bent relation thereto; an extension from said second leg terminating beyond said second acute angle, an extension from said draw bar second end, angled relative thereto to overlie said second leg extensions, means to interlock said second leg and draw bar second end extensions comprising a notch formed in said draw bar second end extension and a lug extending outwardly from said second leg extension, positioned and sized for bent engagement through said notch, and means to attach said gusset within the miter joint of the angularly disposed hollow rails.

2. A corner gusset for fastening a miter joint defined by abutting angular ends of two angularly disposed hollow rails of a frame structure, each rail having generally parallel side walls and an outer edge web spanning the side walls, said corner gusset comprising a generally right triangular bracket formed from a straight bar length of a suitable material such as steel and aluminum, the bar being bent to define first and second right angularly disposed legs and a hypotenuse having first and second ends, comprising a draw bar, and forming first and second acute angles relative to said first and second legs, an extension from said first leg beyond said first acute angle, an extension from said draw bar first end, angled relative thereto to overlie said first leg extension in an integrally formed bent relation thereto; an extension from said second leg terminating beyond said second acute angle, an extension from said draw bar second end, angled relative thereto to overlie said second leg extensions, means to interlock said second leg and draw bar second end extensions; comprising a notch formed in said draw bar second end extension and a lug, extending outwardly from said second leg extension, positioned and sized for bent engagement through said notch, the edge portions of draw bar being expanded outwardly midway along its length, and means to attach said gusset within the miter joint of the angularly disposed hollow rails.

3. A corner gusset for fastening a miter joint defined by abutting angular ends of two angularly disposed hollow rails of a frame structure, each rail having generally parallel side walls and an outer edge web spanning the side walls, said corner gusset comprising a generally right triangular bracket formed from a straight bar length of a suitable material such as steel and aluminum, having bend locating cut-outs along the sides thereof to induce localized bending of said straight bar and being bent to define first and second right angularly disposed legs and a hypotenuse having first and second ends, comprising a draw bar, and forming first and second acute angles relative to said first and second legs, an extension from said first leg beyond said first acute angle, an extension from said draw bar first end, angled relative thereto to overlie said first leg extension in an integrally formed bent relation thereto; an extension from said second leg terminating beyond said second acute angle, an extension from said draw bar second end, angled relative thereto to overlie said second leg extensions, means to interlock said second leg and draw bar second end extensions; comprising a notch formed in said draw bar second end extension and a lug, extending outwardly from said second leg extension, positioned and sized for bent engagement through said notch, and means to attach said gusset within the miter joint of the angularly disposed hollow rails.

* * * * *